United States Patent [19]

Batakis et al.

[11] Patent Number: 4,862,693
[45] Date of Patent: Sep. 5, 1989

[54] FUEL INJECTOR FOR A TURBINE ENGINE

[75] Inventors: Anthony Batakis; Jack R. Shekleton, both of San Diego, Calif.

[73] Assignee: Sundstrand Corporation, Rockford, Ill.

[21] Appl. No.: 131,097

[22] Filed: Dec. 10, 1987

[51] Int. Cl.⁴ ............................................. F02C 7/22
[52] U.S. Cl. ...................................... 60/739; 60/746; 239/86; 239/551; 239/562
[58] Field of Search ................. 60/739, 261, 741, 746, 60/740, 743; 239/86, 550, 551, 562

[56] References Cited

U.S. PATENT DOCUMENTS

| | | | |
|---|---|---|---|
| 2,595,566 | 5/1952 | Carey . | |
| 2,676,461 | 4/1954 | Gove | 60/739 |
| 2,706,520 | 4/1955 | Chandler | 60/739 |
| 2,757,961 | 8/1956 | Nims | 60/739 |
| 2,806,354 | 9/1957 | Cook | 60/739 |
| 2,955,420 | 10/1960 | Schirmer . | |
| 2,981,065 | 4/1961 | Sloan . | |
| 3,516,252 | 6/1970 | Udell et al. | 60/739 |
| 3,933,133 | 1/1976 | Shekleton | 60/743 |
| 3,949,775 | 4/1976 | Cornell | 60/739 |
| 4,028,888 | 6/1977 | Pilarczyk | 60/739 |
| 4,050,238 | 9/1977 | Holzapfel | 60/743 |
| 4,065,917 | 1/1978 | Pfefferle | 60/39.822 |
| 4,084,934 | 4/1978 | Kumazawa | 431/189 |
| 4,229,158 | 10/1980 | Arnold et al. | 431/190 |
| 4,402,184 | 9/1983 | Faulkner et al. | 60/739 |
| 4,417,557 | 11/1983 | Walter | 123/467 |
| 4,467,610 | 8/1984 | Pearson et al. | 60/739 |
| 4,478,045 | 10/1984 | Shekleton | 60/743 |
| 4,688,390 | 8/1987 | Sawyer | 62/160 |

Primary Examiner—Donald E. Stout
Attorney, Agent, or Firm—Wood,Dalton,Phillips Mason & Rowe

[57] ABSTRACT

Manifold head effects at low fuel flows in a fuel injected air breathing turbine are minimized by utilizing fuel injectors having fuel injecting tubes 66 with open ends 70 for fuel injection and provided with elongated capillary tubes 99 upstream thereof and connected to receive fuel from a fuel manifold 48.

11 Claims, 3 Drawing Sheets

FUEL INJECTOR FOR A TURBINE ENGINE

FIELD OF THE INVENTION

This invention relates to turbine engines, and more particularly, to fuel injectors therefor. Specifically, this invention relates to novel fuel injectors which minimize non uniform fuel injection at low fuel flows resulting from the effects of manifold head.

BACKGROUND OF THE INVENTION

As is well known, turbine engines typically include a rotor and a turbine wheel rotatable about a generally horizontal axis. Not infrequently, an annular combustor surrounds the axis and is provided with a plurality of angularly spaced fuel injectors whereby fuel is injected into the combustor to be burned and ultimately directed at the turbine wheel to spin the same. At a location that is usually external of the combustor, a ring-like manifold is utilized as a fuel manifold that interconnects the various fuel injectors.

Because the rotational axis of the compressor and turbine wheel is typically horizontal, the ring-like manifold will be in a vertical plane. This in turn means that the pressure acting on the fuel at the lowermost injectors is greater than the pressure acting on the fuel at the highest injectors as a consequence of gravity acting on the column of fuel within the manifold itself. The pressure difference is due to the pressure head created by the vertical column of fuel in the manifold and thus is termed "manifold head".

In many instances, this does not presented a problem. However, in turbines of the sort whereat very low fuel flows may be employed as for example, small turbines operating at high altitude, substantial nonuniformity in fuel injection may result. In some cases, it is possible that fuel injection will occur only at the lowermost injectors and not at all at the uppermost ones.

This, in turn, can lead to the development of hot spots within the turbine engine which shortens its life as well as operating inefficiencies because of poor, localized combustion.

In order to overcome the difficulty, it has been proposed to provide each fuel injector or, in some cases, pairs of fuel injectors, with an orifice. The orifices then require an increased fuel injecting pressure in order to deliver fuel past the orifice into the combustion chamber and as a consequence, the manifold head pressure at the lower injectors is relatively small compared to the injecting pressure applied to the fuel at all orifices. Thus, substantially uniform injection will occur at all injector locations.

The approach is not altogether satisfactory. For one, in order to increase the pressure drop at each fuel injector sufficiently, the orifices must be made to be relatively small. As a consequence, they are prone to clogging. And, of course, when one or more orifices clog, the corresponding fuel injector is blocked and again, the problem of hot spots arises.

In addition, with orifices, the pressure drop across the orifice rises asymptotically in proportion to fuel flow. This in turn means that undesirably high fuel pressures must be utilized to deliver fuel at high flow rates that are desired for some stages of turbine operation.

The present invention is directed to overcoming one or more of the above problems.

SUMMARY OF THE INVENTION

It is the principal object of the invention to provide a new and improved fuel injector for an air breathing turbine. It is also an object of the invention to provide a new and improved turbine having a fuel injector system that minimizes non uniform injection that results from manifold head.

An exemplary embodiment of the invention achieves the foregoing object in an air breathing turbine including a rotary compressor, a turbine wheel coupled to the compressor, and a combustor between the compressor and the turbine wheel for receiving compressed air from the compressor and combusting fuel therewith to provide combustion gas to the turbine that drives the same. A plurality of angularly spaced fuel injectors, each having an injection opening within the combustor are provided and a fuel manifold extends about the combustor and is in fluid communication with each of the injectors for delivering fuel thereto. Each of the injectors, upstream of the injection opening, and downstream of the manifold, includes an elongated flow path of capillary cross section.

By using a capillary passage, the pressure drop across the same can be controlled by the length of the same, as opposed to the cross section of the same. Thus, an elongated capillary passage may have a substantially larger diameter than an orifice and yet provide the same pressure drop. As a consequence, the capillary passage will be less prone to clogging.

Moreover, it can be shown that low flow rates in a capillary passage, flow will be in a laminar regimen while at higher flow rates, the flow will be in the turbulent regimen. As a result, the pressure drop is not as great at higher flow rates using the capillary passage as would be the case with an orifice because of the lower losses in the turbulent regimen. Thus, a high pressure as required with orifice systems operating at high flow rates need not be employed with the capillary cross section passage.

In a preferred embodiment, the flow path is defined by a capillary tube.

Preferably, the injector includes a conduit and each capillary tube is located within the corresponding conduit.

According to a preferred embodiment, the capillary tube has a downstream end which is angled toward an interior wall of the conduit to direct fuel thereat upstream of the injector opening.

In a highly preferred embodiment, there is provided a plurality of fittings, one for each fuel injecting tube. Each fitting includes an end with a relatively large diameter bore snugly receiving the corresponding fuel injecting tube. A relatively small bore ends in the relatively large bore and snugly receives the corresponding capillary tube. An oppositely directed bore in the fitting establishes fluid communication between the relatively small bore and the capillary tube and the manifold.

Other objects and advantages will become apparent from the following specification taken in connection with the accompanying drawings.

DESCRIPTION OF THE PREFERRED EMBODIMENT

Figure 1:
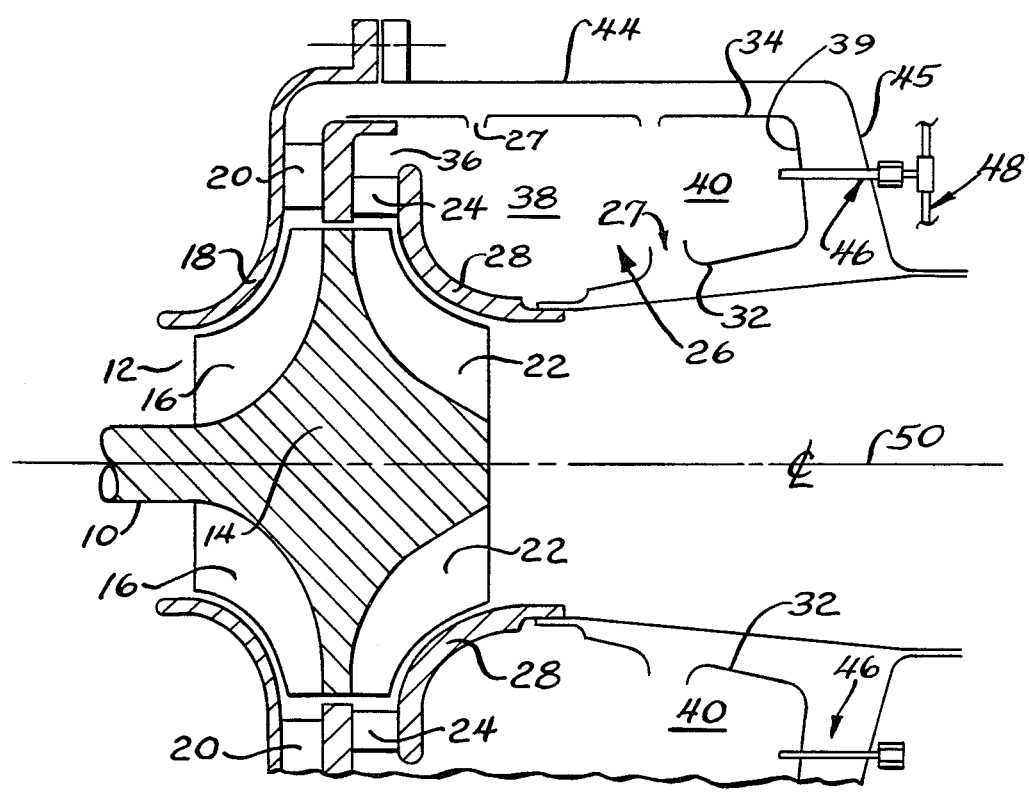
FIG. 1 is a somewhat schematic, sectional view of an air breathing turbine made according to the invention.
Figure 5:
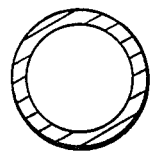
FIGS. 5-9, inclusive, are enlarged, sectional views taken respectively approximately along the lines 5—5, 6—6, 7—7, 8—8 and 9—9 in FIG. 2.
Figure 6:
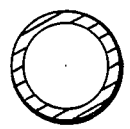
Figure 7:
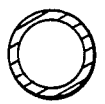
Figure 8:
Figure 9:

An exemplary embodiment of a gas turbine made according to the invention is illustrated in the drawings in the form of a radial flow, air breathing gas turbine. However, the invention is not limited to radial flow turbines and may have applicability to any form of air breathing turbine having a plurality of fuel injectors in differing vertical locations with respect to each other during normal operation.

The turbine includes a rotary shaft 10 journaled by bearings not shown. Adjacent one end of the shaft 10 is an inlet area 12. The shaft 10 mounts a rotor, generally designated 14, which may be of conventional construction. Accordingly, the same includes a plurality of compressor blades 16 adjacent the inlet 12. A compressor blade shroud 18 is provided in adjacency thereto and just radially outwardly of the radially outer extremities of the compressor blades 18 is a conventional diffuser 20.

Oppositely of the compressor blade 16, the rotor 14 has a plurality of turbine blades 22. Just radially outwardly of the turbine blades 22 is an annular nozzle 24 which is adapted to receive hot gases of combustion from an annular combustor, generally designated 26. The compressor system including the blades 16, shroud 18 and diffusere 20 delivers hot air to the annular combustor 26 and via dilution air passages 27, to the nozzle 24 along with the gases of combustion. That is to say, hot gases of combustion from the combustor are directed via the nozzle 24 against the blades 22 to cause rotation of the rotor, and thus the shaft 10. The latter may be, of course, coupled to some sort of apparatus requiring the performance of useful work.

A turbine blade shroud is interfitted with the combustor 26 to close off the flow path from the nozzle 24 and confine the expanding gas to the area of the turbine blades.

The combustor 26 has a generally cylindrical inner wall 32 and a generally cylindrical outer wall 34. The two are concentric and merge to a necked down area 36 which serves an outlet from an interior annulus 38 of the combustor 26 to the nozzle 24. A third wall 39, generally concentric with the walls 32 and 34, extends generally radially to interconnect the walls 32 and 34 and to further define the annulus 38.

Opposite of the outlet 36 and adjacent the wall 39, the interior annulus 38 of the combustor 26 includes a primary combustion zone 40 in which the burning of fuel primarily occurs. Other combustion may, in some instances, occur downstream from the primary combustion area 40 in the direction of the outlet 36. As mentioned earlier, provision is made for the injection of dilution air through the passages 27 into the combustor 26 downstream of the primary combustion zone to cool the gases of combustion to a temperature suitable for application to the turbine blades 22 by the nozzle 24.

In any event, it will be seen that the primary combustion zone is an annulus or annular space defined by the generally radially inner wall 32, the generally radially outer wall 34 and the wall 39. However, as will be appreciated by those skilled in the art from the following description, the combustor need not be an annular combustor, but could be comprised of a plurality of generally cylindrical combustors, each having an individual fuel injector.

Figure 2:
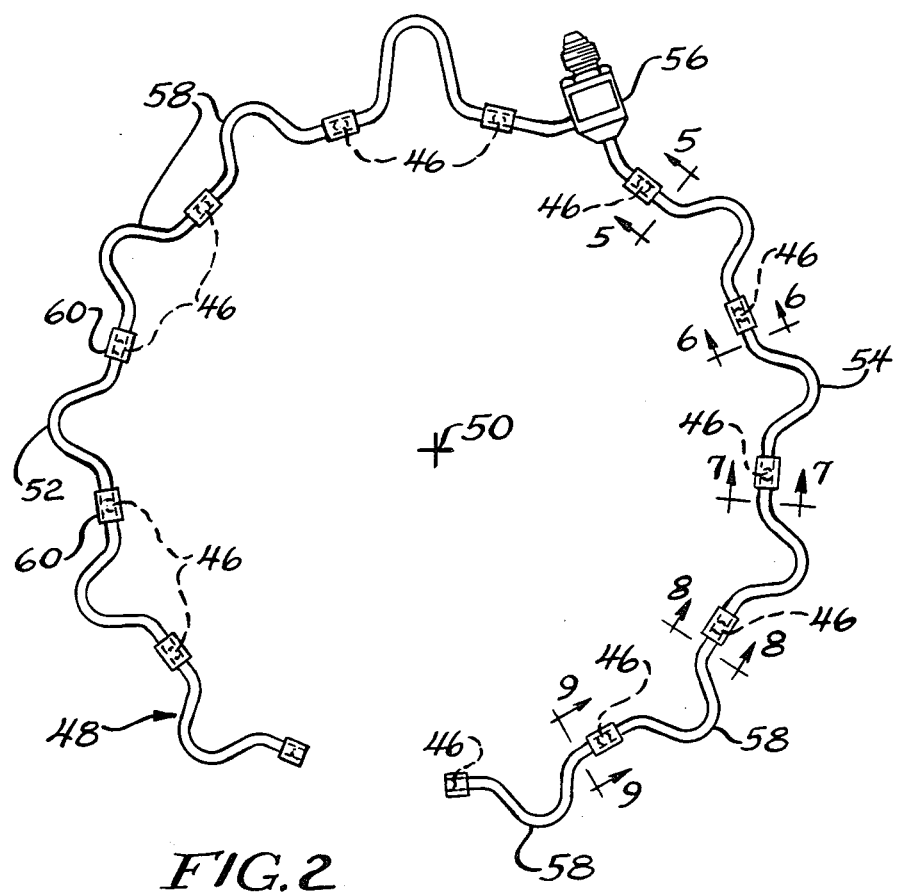
FIG. 2 is a side elevation of a fuel manifold with fuel injectors made according to the invention.
Figure 3:
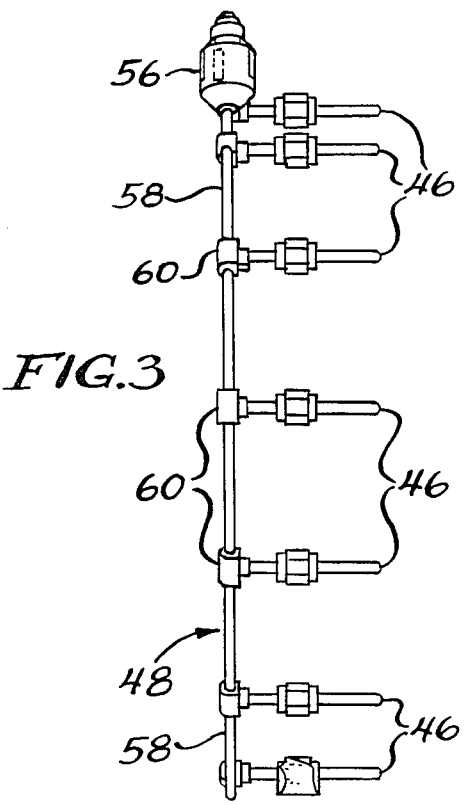
FIG. 3 is a side elevation of the fuel injection manifold and fuel injectors taken at approximately right angles to FIG. 2.

Continuing with the description of FIG. 1, a further wall 44 is generally concentric to the walls 32 and 34 and is located radially outward of the latter. The wall 44 extends to the outlet of the diffuser 20 and thus serves to contain and direct compressed air from the compressor system to the combustor 26. A radially inwardly directed extension 45 of the wall 44 is spaced from the wall 39 to further define the compressed air passage about the combustor 26. Mounted on and extending through the wall 45 as well as the wall 39 are a plurality of fuel injectors, each generally designated 46. The injectors 46 are connected to a common manifold, shown fragmentarily at 48 in FIG. 1 and fully in FIGS. 2 and 3. In normal operation of the turbine, the axis of rotation of the shaft 10, designated 50, will normally be horizontal and thus it will be appreciated that the manifold 48 will be in a vertical plane with the injectors 46 directed generally horizontally and axially into the primary combustion area 40.

In the illustrated embodiment, thirteen injectors 46 are equally angularly spaced about the axis of rotation 50 and are connected into one or the other of two legs, 52, 54 of the manifold 48. The two legs 52 and 54 join at a fitting 56 at the normally uppermost part of the manifold 48 and which is intended to be connected to a source of fuel at varying pressures dependent upon a desired fuel flow.

Each leg 52 and 54 of the manifold is comprised of a plurality of sections 58 of tube having the configuration shown and which are joined by tees 60 which additionally mount the injectors 46. Though not shown in FIG. 2, the inside diameter of the tube sections 58 progressively become smaller in each of the legs 52 and 54 as one moves progressively away from the inlet fitting 56 to the manifold. Compare FIGS. 5-9 inclusive which illustrates the relationship of the inside diameters of the several tube sections 58 employed in the leg 54. The same relationship is true of the various tube sections 58 employed in the leg 52.

It should be appreciated that the showings in FIGS. 5-9, inclusive, are somewhat exaggerated. The purpose of the system is to provide a sufficient interior cross sectional area within the manifold so as to allow the requisite quantity of fuel to flow to the various injectors 46. Thus, at the location represented by the line 5—5, the cross sectional area of the tube will be sufficient to allow adequate fuel flow to five injectors 46 while at the location indicated by the line 9—9, the cross section will be sufficient to supply adequate fuel but to a single one of the injectors 46.

Figure 4:
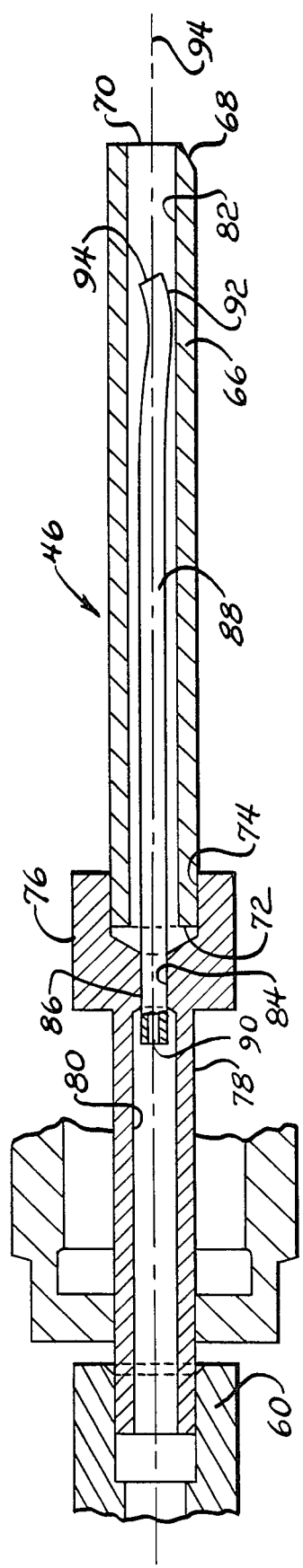
FIG. 4 is an enlarged, fragmentary sectional view of one fuel injector taken approximately along the line 4—4 in FIG. 2.

Turning now to FIG. 4, each individual injector 46 will be described. Each injector includes an elongated tube 66 having an external chamfer 68 at its end located within the primary combustion zone 40. Within the chamfer end 68 is an injection opening 70.

The opposite end 72 of the tube 66 is received in an enlarged bore 74 in a fitting 76 and may be brazed or otherwise held therein.

The fitting 76 has an opposite, reduced diameter end 78 which may be of approximately the same diameter as the tube 76 and which extend to the corresponding tees 60 to be connected thereto. The reduced diameter end has an internal bore 80 that is of the same or generally similar diameter as the internal bore 82 in the tube 66.

Interconnecting the bore 74 and the bore 80 and within the fitting 76 is a small bore 84 which mounts one end 86 of a capillary tube 88. The capillary tube 88 has an outside diameter less than the internal diameter of the bores 80 or 82 and an interior passage 90 of capillary size. The capillary tube 88 is elongated and at its end 92 opposite the end 86 is displaced from the axis of the tube 66 and bent to provide a discharge end 94 directed at an angle against the interior of the bore 82 at a location spaced from the end 70 of the tube 66.

As mentioned, the tube 88 is a capillary tube. As used herein, a capillary is one that, for the lowest fuel flow contemplated through a given injector 46, will allow a laminar flow regimen to exist, and yet, at higher fuel flows, will allow a turbulent flow regimen to exist.

As a consequence, because of the laminar flow regimen at low fuel flows, a high pressure drop will exist across fuel being injected by an injector 46 by reason of the presence of the capillary tube 88. This, in turn, means a relatively high pressure in the bore 80 with a relatively lower pressure equal to that within the combustor at the end 70. Conversely, when the flow regimen switches to turbulent flow for higher Reynolds numbers, the friction factor will decrease and a lower pressure drop will exist across the length of the tube 88.

Because of the high pressure drops at low flow rates, the pressure differential between uppermost ones of the injectors and lowermost ones of the injectors 46 as a result of the manifold head effect will be small in comparison to the pressure drop across the capillary tubes 88 effectively eliminating the influence of manifold head on injection. Conversely, because the pressure drop will decrease as the flow regimen switches to turbulent flow for higher fuel flow rates, the presence of the capillary tubes 88 will not create an intolerably large pressure drop at high fuel flows.

In addition, because an elongated pressure capillary tube 88 is utilized, the same pressure drop that might be obtained out of an orifice can be obtained in a tube having a larger internal diameter. This in turn avoids the problem of clogging that is suffered with orifices that are sufficiently small to minimize the manifold head effect.

The bend at the end 92 of the capillary tube 88 assists in causing fuel exiting the discharge opening 94 to impinge against and reattach itself to the interior of the bore 82 in a somewhat swirling fashion to assure good injection and atomization.

We claim:

1. An air breathing turbine comprising:
   a rotary compressor;
   a turbine wheel coupled to said compressor;
   a combustor between said compressor and said turbine wheel for receiving compressed air from said compressor and combusting fuel therewith to provide combustion gas to said turbine to drive the same;
   a plurality of angularly spaced fuel injectors each having an injector opening within said combustor; and
   a fuel manifold extending about said combustor and in fluid communication with each of said injectors for delivering fuel thereto;
   each said injector, upstream of said injector opening and downstream of said manifold including an elongated flow path of capillary cross section.

2. The air breathing turbine of claim 1 wherein said elongated flow path is defined by a capillary tube.

3. The air breathing turbine of claim 1 wherein each said injector includes a conduit and said capillary tube is located within said conduit.

4. The air breathing turbine of claim 3 wherein said capillary tube has a downstream end which is angled toward an interior wall of said conduit to direct fuel thereat upstream of said injector opening.

5. An air breathing turbine comprising:
   a rotary compressor;
   a turbine wheel coupled to said compressor;
   a combustor between said compressor and said turbine wheel for receiving compressed air from said compressor and combusting fuel therewith to provide combustion gas to said turbine to drive the same;
   a plurality of fuel injecting tubes having angularly spaced, open ends within said combustor, said open ends defining fuel injecting openings, and elongated capillary tubes within each tube through which all fuel must pass prior to reaching the corresponding one of said openings; and
   a fuel manifold in fluid communication with each of said fuel injecting tubes upstream of said capillary tubes and for delivering fuel thereto;
   said capillary tubes serving to minimize non uniform fuel injection at low fuel flows as a result of the effects of manifold head while allowing injection at high fuel flows without undesirably high pressure drops.

6. The air breathing turbine of claim 5 further including a plurality of fittings, one for each fuel injecting tube, each fitting including an end with a relatively large diameter bore snugly receiving the corresponding fuel injecting tube, a relatively small bore ending in said relatively large bore and snugly receiving the corresponding capillary tube, and an oppositely directed bore establishing fluid communication between said relatively small bore and said manifold.

7. The air breathing turbine of claim 6 wherein an end of each said capillary tube is bent to be at an angle to the axis of the corresponding fuel injecting tube at a location upstream of the corresponding fuel injecting opening.

8. The air breathing turbine of claim 5 wherein said manifold has an inlet and defines a flow path to said injectors of decreasing cross section as said inlet becomes progressively more remote.

9. For use in an air breathing turbine including:
   a rotary compressor;
   a turbine wheel coupled to said compressor;
   a combustor between said compressor and said turbine wheel for receiving compressed air from said compressor and combusting fuel therewith to provide combustion gas to said turbine to drive the same;
   and a plurality of angularly spaced fuel injecting nozzles for said combustor and connected by a fuel manifold, a fuel injector comprising:
   a fuel injecting tube having an open end adopted to be located in a combustor; and means for conveying fuel to the interior of said fuel injecting tube upstream of said open end comprising an elongated capillary passage adapted to be connected to receive fuel from a fuel manifold.

10. The fuel injector of claim 9 wherein said capillary passage is defined by a capillary tube.

11. The fuel injector of claim 10 wherein said capillary tube is at least in part disposed within said fuel injecting tube.

* * * * *